Figure 9:
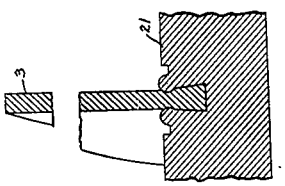
Figure 8:
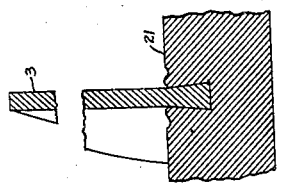
Figure 7:
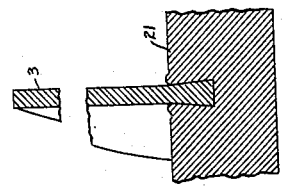

June 14, 1932. A. J. BERG 1,863,552
METHOD OF SECURING METAL FINS TO TUBES OR CYLINDERS
Filed Jan. 25, 1928 2 Sheets-Sheet 1
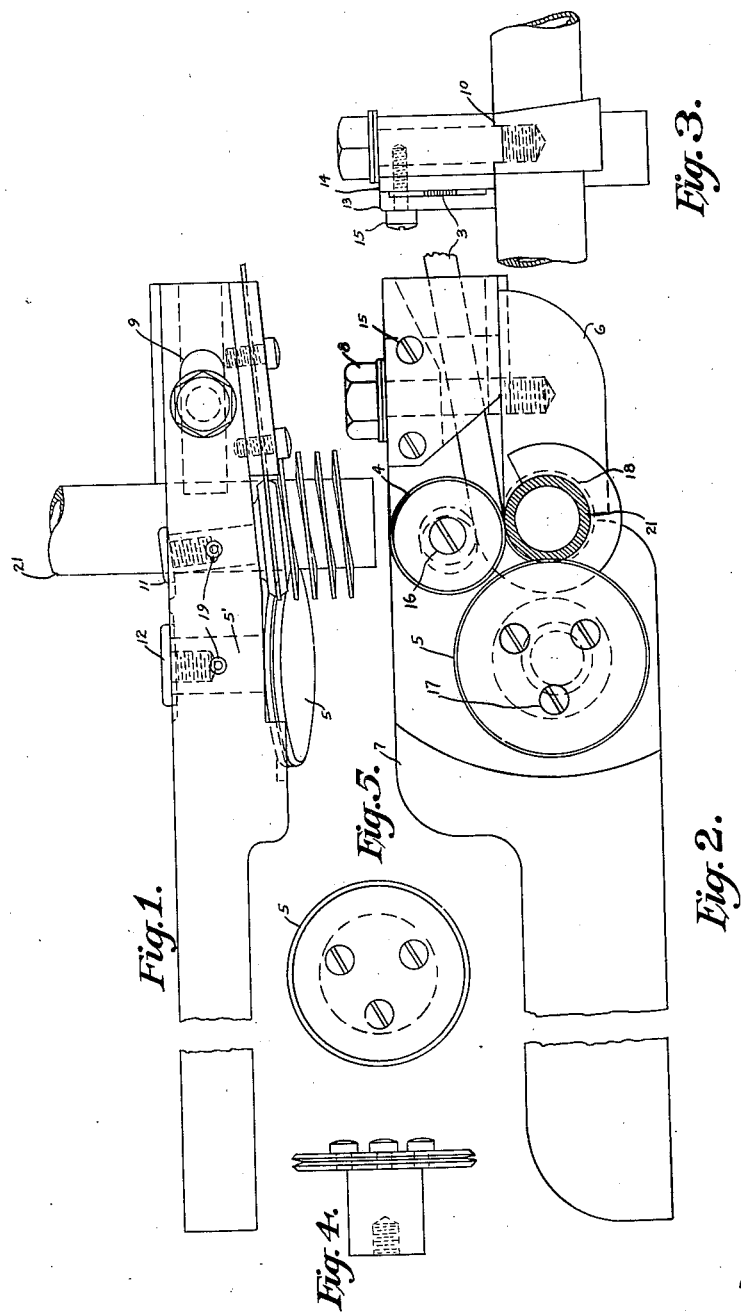
ALFRED J. BERG.
INVENTOR.
BY Harold Dodd
ATTORNEYS.

June 14, 1932. A. J. BERG 1,863,552
METHOD OF SECURING METAL FINS TO TUBES OR CYLINDERS
Filed Jan. 25, 1928 2 Sheets-Sheet 2

ALFRED J. BERG,
INVENTOR.

BY Harold Dodd
ATTORNEYS.

Patented June 14, 1932

1,863,552

UNITED STATES PATENT OFFICE

ALFRED J. BERG, OF PORTSMOUTH, NEW HAMPSHIRE

METHOD OF SECURING METAL FINS TO TUBES OR CYLINDERS

Application filed January 25, 1928. Serial No. 249,405.

(GRANTED UNDER THE ACT OF MARCH 3, 1883, AS AMENDED APRIL 30, 1928; 370 O. G. 757)

My invention relates broadly to metal working and more particularly to methods and apparatus for securing thin metal heat radiating fins on tubes or cylinders of small diameter, and is a continuation-in-part of the Letters Patent No. 1,668,534, granted to me on May 1, 1928.

The object of my invention is to provide an effective yet inexpensive method of securing a strip of metal in and about the periphery of a cylindrical member, in such a manner that the rate of heat transfer from within the tube to the tip of the fin or vice versa is greatly magnified.

Another object of my invention is to provide a method of securing a strip of metal in and about the periphery of the cylindrical member that is rapid in operation and applicable to quantity production of the above described article of manufacture.

A further object of my invention is to produce a finned tube in which it is not necessary to braze or solder the fin to the tube to produce a substantially integral contact between the fin and the metal of the tube.

Heretofore in the production of cylinders of the finned type it has been customary to either cast the fin integral with the cylinder or, in the case of a heat radiating strip that is mechanically fastened to the tube or cylinder, to weld or braze the abutting surfaces together.

The casting method involves the disadvantage of expensive patterns and molding apparatus with the resultant product brittle and fragile unless very thoroughly annealed. Both of these factors are an impediment to speedy production of finned tubes upon a large scale of production at a low price.

The welding and brazing method is slow, tedious and expensive and often fails to give a sufficiently rigid and efficient joint to allow a ready transfer of heat through the tube. Further, as the brazing or soldering metal must have a lower melting point than the metal of the tube and fin this type of tube may not be used where the temperature of the tube raises to a point near the melting point of the brazing or soldering.

My invention, however, eliminates these objections and produces a tube in which the physical contact of the fin and the tube is such that the two might be termed as substantially integral because of the intimate contact of the surfaces of the metal of the fin and of the metal of the tube. This intimate contact is produced by the tendency of the metal of the tube to expand due to the method of attaching the fin to the tube and in addition to this the tendency of the metal of the tube to expand into the metal of the fin, which tendency is created by the crimping and upsetting of the metal of the tube in close proximity to the fin as a final step in the production of the finished product.

The novelty of my invention resides in the elimination of certain steps in the method claimed in that application by the alteration of certain elements of the structure of the apparatus therein disclosed.

My invention consists substantially in the method and apparatus, together with the parts associated therewith in the production of a finned tube of the character described above or as will be more fully hereinafter set forth as shown by the accompanying drawings and finally pointed out in the appended claims.

Figure 11:
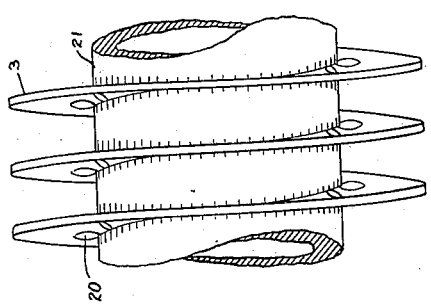
Figure 10:
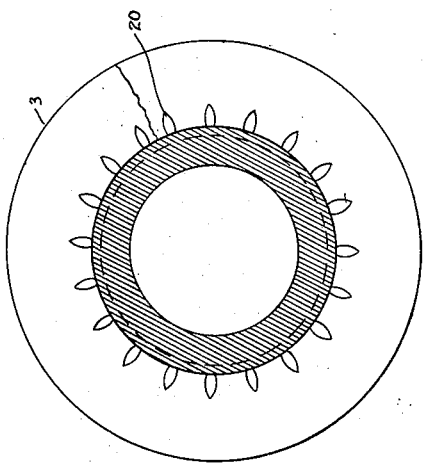

Reference is to be had to the accompanying drawings forming a part of this specification in which like reference characters indicate corresponding parts throughout the several views and in which Figure 1 is an elevational view of my improved tool for fastening fins to tubes or cylinders, Figure 2 is an elevational view thereof, Figure 3 is an end view thereof in elevation, Figure 4 is a detail side view of the crimping wheel, Figure 5 is a detailed end view thereof, Figures 6, 7, 8, and 9 illustrate several steps in the production of finned tubes with various fastening arrangements, and Figures 10 and 11 end and side views of a tube which constitutes the finished product.

Referring particularly to Figures 1, 2, and 3 the tool body proper consists of a wrought steel member 7 which is cut at one end to fit a standard tool post and tapered in thickness at the other end, one side of the tool body, however being a straight line as shown in detail in Figure 1. The tapered end of the tool body corresponds approximately to the pitch of the fin upon the completed tube.

A portion of the tapered section of the member 7 is recessed to form a section that is parallel to the straight side of the member in longitudinal relationship but slanted from the vertical plane to such an angle that it coincides with the slant of the fin upon the completed tube.

Upon this recessed portion is mounted the crimp wheel 5 that carries a spindle $5^1$ which extends through the body portion 7 and terminates in a thrust fastening element 12. I have provided an oil hole 19 to enable proper lubrication of the spindle $5^1$ in its rotary movement in the body portion 7.

As illustrated in Figure 2 the under portion of the member 7 is recessed to accommodate the unfinished tube 21 in such a manner that when the element 6 is in position, the recessed portion of the member 7 and the arcuate portion of the member 6 form a cylindrical passage through the tool of a diameter similar to that of the tube 21. The element 6 is rigidly mounted upon the member 7 by means of a clamp screw 8 which passes through a slot 9.

The element 6 also has one side bevelled to correspond to the taper of the member 7 but a little offset therefrom to form a guide surface for the strip 3. The strip 3 is firmly held against the bevelled surface of the element 6 by means of a recessed plate 13 and pressure screws 15.

In alignment with the guide face of the element 6 and the crimp wheel 5 is a lead wheel 4 which is mounted upon a spindle 11 that extends through the body portion 7 and is provided with an oiler conduit 19. This lead wheel preferably consists of two metallic discs, spaced apart approximately a distance equal to the thickness of the strip. These discs are free to rotate with the spindle along an axis which is positioned at an angle to the tool body, the angle corresponding to the angle of taper of the member 7, the bevel of the element 6 and the angle of pitch of the fin upon the tube.

It is to be noted that in the apparatus described above I have eliminated the use of any cutter or groove former as is used in the device disclosed in the parent application.

The operations in the process of forming a finned tube in which my apparatus would be involved are as follows. When, for instance, the tool body is rigidly fastened in the post of a standard lathe which is equipped with a thread cutting gear, which in this case merely serves the function of determining the pitch of the helical fin upon the tube, and when, in said instance, the tube is mounted between the centers of the lathe and chuck in the usual manner, and started to rotating, the metal strip, as shown in Figure 2, may be led from a suitable carrier such as a spool or the like (not shown) and passed between guide plates 13 and 14 which apply pressure to the metal strip 3 by screws 15. The recessed portion of the plates is sufficiently shallow that the plates 13 and 14 grip the fin strip sufficiently to exert a frictional tension thereon as the strip is being wound upon the tube. Such tension causes the strip 3 to be progressively wound upon and secured to the tube, or heat exchanger element, while under substantial longitudinal tension, the degree of which tension being adjustable by screws 15. This tension-winding and uniting of strip 3 upon said element provides a rigid fin, however thin it may be, which affords high resistance to accidental bending or distortion of such fin, besides enabling fins of far lesser thickness to be employed, thus affording a greater number of such fins with ample intervening air, or other interchange, spaces and hence greater heat interchange than would otherwise be possible.

The fin being thus imbedded into the metal of the tube or element causes an increase in the density of the metal of the tube or element about the base of the fin, which increased density produces greater heat conductivity to or from the fin.

The strip is then extended into the peripheral groove of the lead wheel 4, which in this case is of smaller radius than the width of the fin strip. The lead wheel 4 is so positioned that the distance between the bottom of the groove and the surface of the tube 21 is appreciably less than the width of the fin-strip. Also the lead wheel 4 is positioned along the body member at a point such that the crushing of the fin into the metal of the tube occurs simultaneously with the bending of the fin strip to conform with the contour of the tube.

Figure 6:
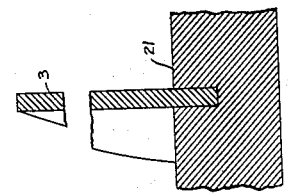

From the above description of the structure of the apparatus so far it becomes apparent that should the metal of the tube be less rigid than the metal of the fin-strip the fin-strip will cut its own groove into the tube as shown in Figure 6. Then as the finstrip passes between the lead wheel and the tube with the simultaneous bending of the fin-strip to conform to the contour of the tube, the metal of the fin-strip will be upset, such upsetting occurring more at the inner radius of the fin than near the outer periphery thereof. The operation to this extent produces a dove-tail union between the fin-strip and the tube.

In practice I have found that the apparatus above described is all that is needed in the production of a completed finned tube, for as the tube is rotated under the power of the lathe and the fin-strip made to conform to a helical spiral along the tube the dove-tail joint with the pressure of the metal of the fin tending to expand and press against the walls of the groove which it has made for itself in the tube wall, will maintain the fin in a fixed relation with the tube under substantially all conditions. However, as an added precaution, and to adapt the device to all relative rigidities rather than limiting its application only to a certain range of those values of the tube and the fin in which the rigidity of the fin-strip metal is equal to or greater than that of the metal of the tube, I have provided an additional crimping wheel 5 which is mounted upon the body portion 7 in alignment with the locus of the helical fin. This crimping wheel is composed of two discs one of which parallels each side of the fin and upsets the metal of the tube about the fin in such a manner that it produces the joint shown in Figure 9.

With this apparatus, the resultant structure is a finned tube which has a structure shown in Figures 9, 10 and 11 in which the pin perforations 20 in the fin are optional the same as in the tube produced by the method and apparatus described in my earlier application.

While I have shown and described specific shapes of joints obtained by a definite relation between the diameter of the lead and crimp wheels with respect to that of the tube, in addition to the relative positions of the wheels and the pressure in which they operate, either upon the strip or the metal adjacent the strip, the type of joint may be modified to meet a given condition by changing the above described relations.

Further, although I have described my device for practicing my method as one in which the tool is stationary and the work rotates, I consider that any modification of the tool whereby the work remains stationary and the tool rotates about the work, is within the scope of my invention and mere mechanical skill as in actual production of the tubes of the character described I have used the tool in both methods of operation.

The apparatus disclosed herein forms the subject matter of my co-pending application Serial Number 249,404.

It will be understood that the above description and accompanying drawings comprehend only the general and preferred embodiment of my invention and that minor detail changes in the construction and arrangement of parts of its exemplifying apparatus may be made within the scope of the appended claims without sacrificing any of the advantages of my invention.

It will be understood from the foregoing, by those skilled in the heat exchanger art, that the member 21 may be a tube whose bore acts as a conduit for the passage of a medium which is to impart or receive heat to or from a medium without said member, but that when member 21, for instance, is an electrical resistance it need not be tubular or be provided with a bore or cavity.

The invention herein described may be manufactured and used by or for the Government of the United States for governmental purposes without the payment to me of any royalty thereon or therefor.

Having thus described my invention what I claim is:

1. The method of forming a heat radiator element which includes progressively inwardly crushing a portion of a fin-strip into the metal of the element.

2. The method of forming a heat radiator element which includes crushing a portion of a fin-strip into the metal of the element by pressure inwardly applied progressively along the fin-strip.

3. The method of forming a heat radiator element which includes crushing the edge of a fin-strip into the metal of the element to form a groove and upsetting the edge of the strip against the sides of the groove.

4. The method of forming a heat radiator element which includes crushing the edge of a fin-strip into the metal of the element to form a groove and upsetting the edge of the strip within the groove.

5. The method of forming a heat radiator element which includes crushing the edge of a fin-strip into the metal of the element to form a groove and crimping the edges of the groove against the sides of the strip.

6. The method of forming a heat radiator element which includes crushing the edge of a fin-strip into the metal of the element to form a groove, upsetting the edge of the fin-strip within the groove and crimping the edges of the groove against the sides of the strip.

7. The method of forming a heat radiator element which includes crushing the edge of a fin-strip into the metal of the element to form a groove, upsetting the edge of the fin-strip against the sides of the groove and crimping the edges of the groove against the sides of the strip.

8. The method of forming a heat radiator element which includes crushing the edge of a fin-strip into the metal of the element to form a groove and upsetting the metal of the edge of the fin-strip against the bottom and sides of the groove.

9. The method of forming a heat radiator element which includes crushing the edge of a fin-strip into the metal of the element to form a groove, upsetting the metal of the edge of the fin-strip against the bottom and sides of the groove and crimping the metal of the edges of the groove against the sides of the strip.

10. The method of forming a heat radiator element which includes crushing the edge of a fin-strip into the metal of the element to form a groove and crimping the metal of the edges of the groove into the metal of the fin-strip.

11. The method of forming a heat radiator element which includes crushing the edge of a fin-strip into the metal of the element to form a groove and crimping the metal of the edges of the groove into the metal of the fin-strip while maintaining the fin-strip at the bottom of the groove.

12. The method of forming a heat radiator element which includes crushing the edge of a fin-strip into the metal of the element to form a groove and crimping the metal of the edges of the groove into the metal of the fin-strip while maintaining the finstrip at the bottom of the groove by bending the fin-strip about the element.

13. The method of forming a heat radiator element which includes crushing the edge of a fin-strip into the metal of the element to form a groove and crimping the metal of the edges of the groove into the metal of the fin-strip while maintaining the fin-strip at the bottom of the groove by bending the fin-strip helically about the element.

14. The method of forming a heat radiator element which includes crushing the edge of a fin-strip into the metal of the element to form a groove and upsetting the metal of the fin-strip into the groove by bending the fin-strip to conform to the contour of the element.

15. The method of forming a heat radiator element which includes crushing the edge of a fin-strip into the metal of the element to form a groove, upsetting the metal of the fin-strip into the groove by bending said fin-strip to conform to the contour of the element and upsetting the edge of the fin-strip against the side of the groove by bending the fin-strip to conform to the contour of the element.

16. The method of forming a heat radiator element which includes crushing the edge of a fin-strip into the metal of the element to form a groove, upsetting the metal of the fin-strip into the groove by bending the fin-strip to conform to the contour of the element and crimping the edges of the groove against the sides of the fin-strip.

17. The method of forming a heat radiator element which includes crushing the edge of a fin-strip into the metal of the element to form a groove, upsetting the metal of the fin-strip into the groove by bending said fin-strip to conform to the contour of the element, upsetting the edge of the fin-strip against the side of the groove by bending the fin-strip to conform to the contour of the element and crimping the edges of the groove against the sides of the fin-strip.

18 The method of forming a heat radiator tube which includes crushing the edge of a fin-strip into the metal of the tube to form a groove, upsetting the metal of the fin-strip into the groove by bending the fin-strip to conform to the contour of the tube, and crimping the metal of the edges of the groove into the metal of the fin-strip.

19. The method of forming a heat radiator tube which includes crushing the edge of the fin-strip into the metal of the tube to form a groove, upsetting the metal of the fin-strip into the groove by bending said fin-strip to conform to the contour of the tube, upsetting the edge of the fin-strip against the side of the groove by bending the fin-strip to conform to the contour of the tube and crimping the metal of the edges of the groove into the metal of the fin-strip.

20. The method of forming a heat exchanger element, which includes placing a fin-strip under longitudinal tension and crushing a portion of said strip into the metal of the element.

21. The method of forming a heat exchanger element which includes placing a fin-strip under longitudinal tension and crushing a portion of said strip into the metal of the element by pressure upon another portion of said strip.

22. The method of forming a heat exchanger element, which includes placing progressive portions of a fin-strip under tension and crushing an edge of said tension portions progressively into the metal of the element.

23. The method of forming a heat exchanger element including the steps of placing a portion of a fin-strip under tension, crushing an edge of said portion of said strip into the metal of the element, and progressively continuing said steps.

24. The method of forming a heat exchanger element which includes placing a fin-strip under longitudinal tension, crushing an edge of said strip into the metal of the element, and upsetting said crushed edge of said strip beneath the surface of said element.

25. The method of forming a heat exchanger element which includes placing a fin-strip under longitudinal tension, crushing an edge of said strip into the metal of the element by pressure upon another edge of said strip, and upsetting said crushed edge of said strip beneath the surface of said element.

26. The method of forming a heat exchanger element which includes placing progressive portions of a fin-strip under tension, crushing an edge of said tension portions progressively into the metal of the element, and upsetting said crushed edge of said strip beneath the surface of said element.

27. The method of forming a heat exchanger element including the steps of placing a portion of a fin-strip under tension, crushing an edge of said portion of said strip into the metal of the element, progressively continuing said steps, and upsetting said crushed edge of said strip beneath the surface of said elements.

28. The method of forming a heat exchanger element which includes placing a fin-strip under longitudinal tension, crushing an edge of said strip into the metal of the element, and moving metal of the element into further contact with said strip.

29. The method of forming a heat exchanger element which includes placing a fin-strip under longitudinal tension, crushing an edge of said strip into the metal of the element by pressure upon another edge of said strip, and moving metal of the element into further contact with said strip.

30. The method of forming a heat exchanger element which includes placing progressive portions of a fin-strip under tension, crushing an edge of said tension portions progressively into the metal of the element, and moving metal of the element into further contact with said strip.

31. The method of forming a heat exchanger element including the steps of placing a portion of a fin-strip under tension, crushing an edge of said portion of said strip into the metal of the element, progressively continuing said steps and moving metal of the element into further contact with said strip.

32. The method of forming a heat exchanger element including the crushing of an edge of a fin-strip into the metal of the element by a rolling pressure.

33. The method of forming a heat exchanger element which includes crushing an edge of a fin-strip into the metal of the element by a rolling pressure applied upon another edge of the fin-strip.

ALFRED J. BERG.